United States Patent [19]

Price et al.

[11] Patent Number: 5,434,909
[45] Date of Patent: Jul. 18, 1995

[54] METHODS AND APPARATUS FOR INTEGRATED VOICE COMMUNICATION

[75] Inventors: Robert Price, Austin; Jeff Scruggs, Lewisville, both of Tex.

[73] Assignee: Texas Instruments Incorporated, Dallas, Tex.

[21] Appl. No.: 330,408

[22] Filed: Oct. 28, 1994

Related U.S. Application Data

[63] Continuation of Ser. No. 580,735, Sep. 11, 1990, abandoned.

[51] Int. Cl.6 ............................................. H04M 3/50
[52] U.S. Cl. ...................................... 379/88; 379/67; 379/212
[58] Field of Search ................ 379/89, 67, 88, 210, 379/212, 213, 214

[56] References Cited

U.S. PATENT DOCUMENTS

| | | | |
|---|---|---|---|
| 4,608,460 | 8/1986 | Carter et al. | 379/71 |
| 4,625,081 | 11/1986 | Lotito et al. | 379/88 |
| 4,677,657 | 6/1987 | Nagata et al. | 379/63 |
| 4,731,811 | 3/1988 | Dubus | 379/58 |
| 4,757,525 | 7/1988 | Matthews et al. | 379/89 |
| 4,827,500 | 5/1989 | Binkerd et al. | 379/88 |
| 4,878,239 | 10/1989 | Solomon et al. | 379/67 |
| 4,879,743 | 11/1989 | Burke et al. | 379/142 |
| 4,899,373 | 2/1990 | Lee et al. | 379/207 |
| 4,930,152 | 5/1990 | Miller | 379/214 |
| 4,972,461 | 11/1990 | Brown et al. | 379/67 |
| 4,979,206 | 12/1990 | Padden et al. | 379/67 |
| 5,022,069 | 6/1991 | Chen | 379/67 |
| 5,131,024 | 7/1992 | Pugh et al. | 379/67 |

FOREIGN PATENT DOCUMENTS

| | | | |
|---|---|---|---|
| 0330441A | 2/1989 | European Pat. Off. | H04Q 3/62 |
| 0055654 | 4/1982 | Japan | 379/209 |
| 0143972 | 9/1982 | Japan | 379/84 |

OTHER PUBLICATIONS

Tetsuya Isayama and Takeshi Mochizuki, "Voice Storage Services," *Japan Telecommunications Review*, vol. 28, No. 4 Oct. 1986, pp. 271–280.

*Primary Examiner*—Thomas W. Brown
*Attorney, Agent, or Firm*—Thomas G. Eschweiler; James C. Kesterson; Richard L. Donaldson

[57] ABSTRACT

An integrated voice communication system is provided which includes first circuitry for delivering a stored message to a subscriber calling party upon the receipt of a first command. Second circuitry is coupled to the first circuitry and is operable to create a direct connection with a selected called party without exiting the system upon the receipt of a second command.

6 Claims, 3 Drawing Sheets

METHODS AND APPARATUS FOR INTEGRATED VOICE COMMUNICATION

This application is a Continuation, of application Ser. No. 07/580,735, filed Sep. 11, 1990, abandoned.

TECHNICAL FIELD OF THE INVENTION

The present invention relates generally to voice communication systems and more particularly to methods and apparatus for integrated voice communications.

BACKGROUND OF THE INVENTION

Voice communications have become an important factor in increasing the productivity of modern day business concerns. Newly developed voice communication systems, including voice messaging and call delivery systems, have allowed the efficient transfer of information without the need of paperwork or specialized computer equipment. These systems have become more expanded in scope, such that the number of subscribing users able to link up to a particular system as well as the number of convenience features available have both significantly increased. Research and development efforts continue, however, in search of new ways to increase the efficiency of voice communication systems while at the same time allowing such systems to be "user-friendly" to the average subscriber.

Even with the technical expansion of the voice communication industry, existing voice message and call delivery systems available on the market, still retain substantial inconveniences. One such inconvenience is encountered when a subscriber receives a voice message from a calling party and desires to promptly answer it with a return direct telephone call. In currently available voice communication systems, the subscriber must exit the voice messaging system in order to place a direct dial outside telephone call. The subscriber is therefore faced with the choice of either listening to all his voice messages and then exiting the system to make the required outside telephone call, or immediately leaving the voice communication facility, making the telephone call and then reentering the voice communication system to retrieve the remaining voice messages. Neither of these options is very efficient. In the first option, the subscriber may need to write down the name and number of the calling party so that the information will not be forgotten during the period in which the remaining messages are being retrieved. In the second option, the subscriber must subject himself to the entire process of reentering the system, which may include regaining access through the associated security steps as well as retracing through the system menus and associated command inputs to reach the stored information.

Another significant disadvantage with presently available voice communication systems is encountered when a voice message is deposited in the voice mailbox of another subscribing user. In this case, the message may remain in the voice mailbox for an undesirable long period of time until finally retrieved by the called party. This problem becomes acute when important information must be delivered and it is difficult or impossible for the calling subscriber to continue to try and establish direct contact. One means of alleviating this problem is to direct the voice mail system to automatically and periodically query the telephone of the called party until a recorded voice message can be directly delivered. This system is efficient as long as the called party returns to the area of the telephone within a reasonable period of time. Otherwise, the extension will be queried without avail.

Thus, a voice communication system is needed which provides a more efficient use of the communication system.

SUMMARY OF THE INVENTION

According to the invention, an integrated voice communications system is provided which includes first circuitry for delivering a stored message to a subscriber calling party upon the receipt of a first command. Second circuitry is provided coupled to the first circuitry and is operable to create a direct connection with a selected called party without exiting the system upon the receipt of a second command.

According to other aspects of the invention, the subscriber calling party is returned to that point in the system where the calling party may listen to a second message stored in the system. In addition, the subscriber calling party may deliver a voice message to another subscribing party using a rapid call delivery option. Under the rapid delivery option, a subscriber calling party leaves a message with the system, the system then both deposits the message with the voice mailbox of the subscriber called party while simultaneously attempting to deliver the message via the establishment of a direct connection to the called party's telephone.

The present invention provides the significant advantage of allowing subscriber calling party to place a direct telephone call without the need for exiting the voice communication system itself. This feature allows the calling party to immediately respond to each voice message as it is received. Further, by using the rapid call delivery option, the probability is increased that important information can be transferred to the called party, even if that called party is away from the area of their telephone.

BRIEF DESCRIPTION OF THE DRAWINGS

Other aspects of the invention and their advantages may be discerned when one refers to the following detailed description as taken in conjunction with the drawings in which like numbers identify like parts, and in which.

DETAILED DESCRIPTION OF THE INVENTION

Figure 1:
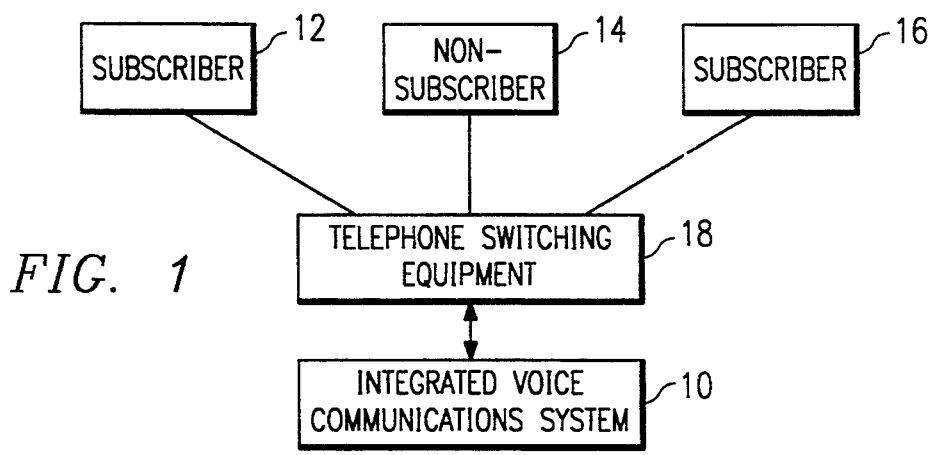
FIG. 1 is a block diagram of an integrated voice communications system according to the invention and associated communications equipment.

Referring first to FIG. 1, a top level block diagram is shown depicting the interface between an integrated voice communication system 10 and a calling subscriber 12 through telephone switching equipment 18. A non-subscribing telephone is shown at 14, while a second subscriber telephone is shown at 16. Telephones of subscribers 12 and 16 voice messaging (voice mailbox) services.

Figure 2:
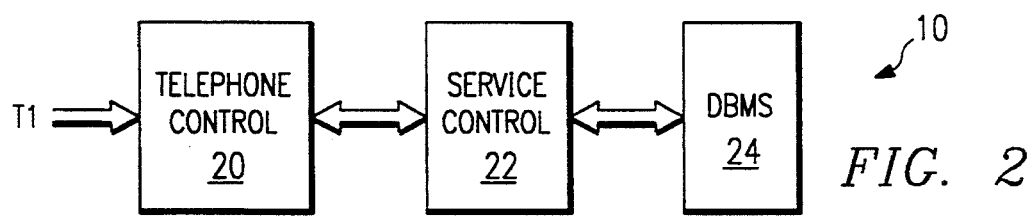
FIG. 2 is a top level block diagram of the integrated voice communications system depicted in FIG. 1.

FIG. 2 illustrates a block diagram of a communications system 10. The communications system 10 comprises a telephony control section 20 connected to a T1 line, a service control section 22 connected to the telephony control section 20 and a database management system (DBMS) 24.

In operation, the DBMS 24 is a mainframe computer which maintains customer records, billing information, voice mail files, and other data requiring a larger database system. The service control section 22 provides the interface between the database management system 24 and the users of the communications system. For example, the service control section 22 would oversee the voice mail system. This would entail retrieving messages from the DBMS 24, prompting the caller for instructions, and so on. The telephony control section 20 interfaces with the T1 line, performing the actual sending and receiving of voice data to the caller and managing the communications protocols.

Figure 3:
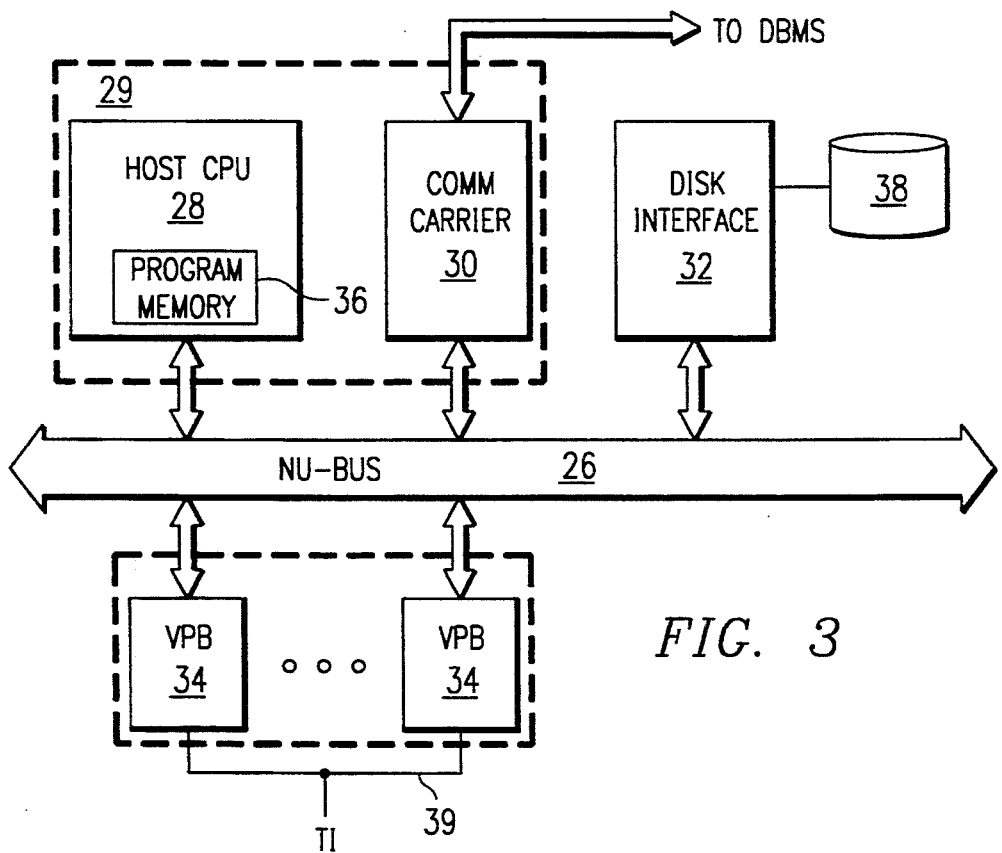
FIG. 3 is a more detailed block diagram of the integrated voice communications system depicted in FIG. 1.

FIG. 3 illustrates a more detailed block diagram of the communications system 10 of FIG. 1. A bus 26, preferably conforming to the NU-BUS standard, is coupled to a host CPU 28, a communications carrier 30, a disk interface 32, and a plurality of voice processing boards 34. The host CPU 28 is coupled to a program memory 36. The disk interface is coupled to a hard disk 38, or other mass storage device. The VPBs are also connected to the T1 line via a T1 bus 39. The communications carrier 30 is connected to the DBMS.

The VPBs 34 comprise the telephony control section 20. Each VPB 34 comprises a plurality of digital signal processors (DSPs). Each VPB board is preferably a multi-tasking system, such that each VPB 34 handles multiple channels on the T1 line.

The CPU 28 preferably comprises a microprocessor, for example, the Motorola 68030. The program memory 36 stores program routines and data parameters which are transferred to the VPBs 34 under control of the CPU 28. The CPU 28 also contains a local program memory (not shown) which provides instructions for the microprocessor.

The communications carrier 30 provides the communications functions to transfer information between the bus 26 to the DBMS 24. The disk interface 32 provides an interface between the bus 26 and a mass storage device, such as hard disk 38.

In operation, the CPU 28 transfers program routines and data parameters from the program memory 36 to the VPBs 34. The VPBs 34 execute the program routines downloaded by the CPU 28. When execution of the program routines is complete, the CPU 28 is notified at this time via bus 26, and the CPU may download another program routine.

Each program routine may be thought of as a portion of an application program. By executing only a portion of an application program in the VPB 34, two advantages are evident. First, the program routines allow an execution of an application program which has memory requirements much greater than the local memories contained in the VPBs 34. Further, an application program may be dynamically adjusted during runtime by modifying the order of program routines transferred to the VPBs 34.

Figure 5:
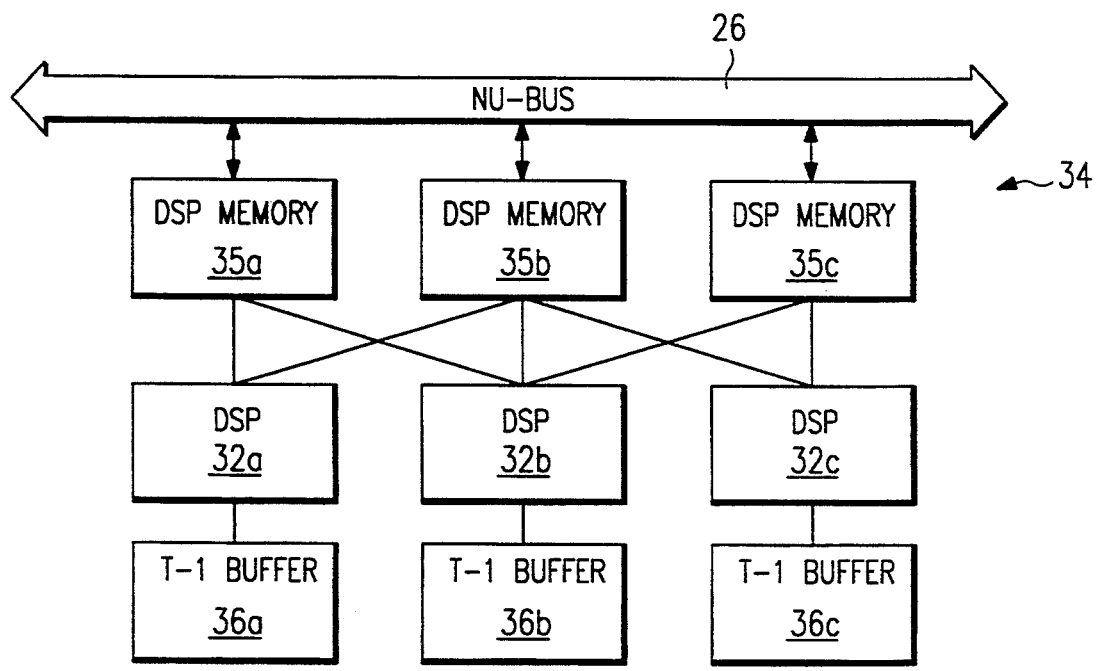
FIG. 5 is a block diagram of a Voice Processor Board according to the invention.

FIG. 5 illustrates a block diagram of a VPB 34. Each VPB 34 comprises a plurality of DSPs 32 (shown individually as DSP 32a–c). Each DSP 32a has a respective DSP memory 35a–c and a respective T1 buffer 36a–c. The DSP memories 34a–c are cross-coupled between the DSPs 32a–c such that communication between the DSPs is possible.

Figure 4:
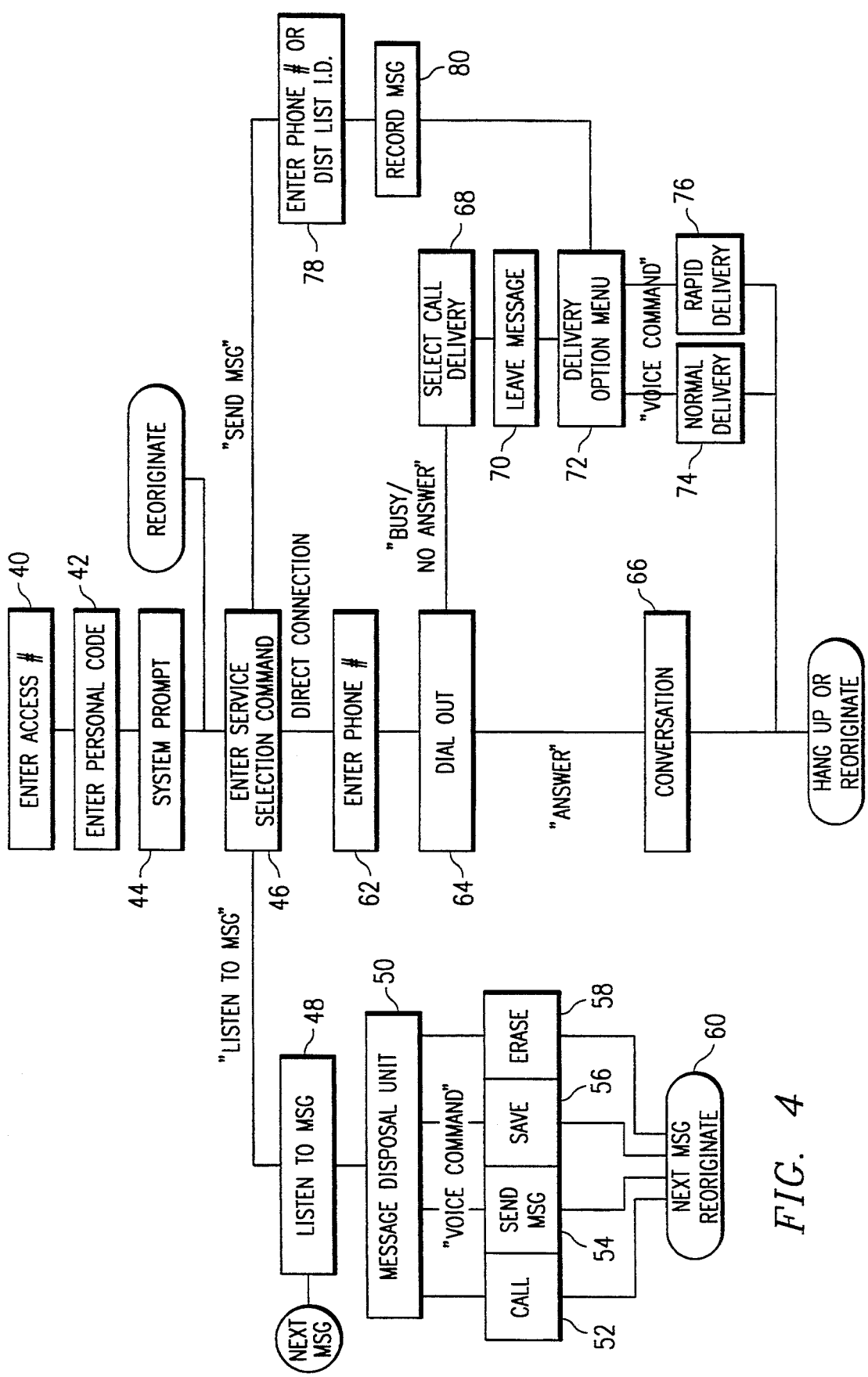
FIG. 4 is a top level flow chart describing the operation of the integrated voice communications system according to the invention.

Referring next to FIG. 4, a top level flow chart is given which describes the overall operation of integrated voice communication system 10. Subscriber 12 first gains access to integrated voice communication system 10 by inputting an access number at step 40 which will create the required connection through telephone switching equipment 18. The access number may be for example an "800 number" well known in the communications art. Following connection to system 10, subscriber 12 inputs a personalized code at step 42 to access operational features of system 10, such as the voice mailbox of subscriber 12. The personalized code may be, for example, a series of numbers or letters identifying subscriber 12. Further, the code may be entered as an intent phrase voice command; subscriber 12 may vocally enter the code as a series of words and numbers indicating the intent to gain access.

Next, system 10 issues a vocal prompt at step 44 indicating the number of messages, if any, that may have been left for subscriber 12 in voice mailbox designated for subscriber 12. In response, subscriber 12 enters a service selection command at step 46 through which subscriber 12 requests one of the options of: listening to any stored messages directed to subscriber 12, directly placing a telephone call, or sending a voice message to a subscriber 18. The service selection command may be a DTMF signal produced by telephone of subscriber 12 following a pushbutton input, or may be an intent driven voice phrase command phrase, such as "listen to messages."

If subscriber 12 has entered a service select command at step 46 requesting playback of any stored voice messages (the "listen to messages" option), the first message available is retrieved at step 48 from the designated voice mailbox and played back to subscriber 12. Following the playback of voice message at step 48, a voice message disposal menu is issued at step 50 by system 10. Subscriber 12 can then selectively respond to the information distributed by the voice message in accordance with the options presented by the menu. In the first option, a call command may be entered at step 52. Under this command, subscriber 12 can place a direct telephone call to a non-subscribing called party 14 or a subscribing called party 16 without leaving the services of voice communication system 10. Once the telephone call is completed at step 60, subscriber 12 automatically receives the next message in the voice mailbox, or, if no voice messages remain, is returned to step 46 to input an alternate service selection command. In the second option, subscriber 12 enters a "send message" command at step 54 which allows the delivery of a message to a subscriber 18 within the system, as will be discussed in more detail below.

Besides the options of responding to a voice message by either a direct telephone call or a voice message, subscriber 12 additionally has options for disposing of the message itself. The voice message may be saved by the entry of a "save" command at step 56 or erased with the entry of an "erase" command at step 58. Each of these steps may also be implemented by intent driven voice phrase commands. Following disposition of the message, the processing again continues at step 60 at which time subscriber 12 can receive the next message in the voice mailbox, or if no messages remain, is brought back to step 46 for the input of an alternate service selection command.

If subscriber 12 has entered a service command at step 46 requesting a direct connection to a selected non-subscriber 14 or subscriber 16, subscriber 12 enters the telephone number of the desired called party at step 62. Voice communication system 10 then directs the dial out through switching equipment 18 to the called party at step 64. If a connection is established to the called party, the desired conversation occurs at step 66. If, however, the called party is busy or does not answer, subscriber 12 is given the option of selecting call delivery at step 68. If call delivery is selected, at step 70 subscriber 12 leaves a message in voice communication system 10. A delivery option menu is provided at step 72 giving subscriber 12 the option of having the message delivered to the desired called party under either a normal delivery protocol at step 74 or a rapid delivery protocol at step 76.

Under normal delivery protocol, if the called party is a subscriber 16, the message is delivered to the voice mailbox of the selected subscriber 16. If the called party is a non-subscriber 16, system 10 will try to deliver the message by automatically querying the called party telephone, once per hour, up to eight times if the telephone continues to remain unanswered.

Under the rapid delivery protocol of step 76, with either a non-subscriber called party 14 or a subscriber called party 16, voice communication system 10 will try to deliver the message, in the preferred embodiment, once every fifteen minutes, up to eight times. The subscriber may be given the option in other embodiments to specify the number of tries and the period between them for customized rapid delivery. Additionally, if the called party is a subscriber 16, the message will also be deposited in the voice mailbox of the called subscriber 16. If the called subscriber 16 receives the message via a direct call delivery, the message in the voice mailbox is automatically erased. If, on the other hand, subscriber 16 retrieves the message from the voice mailbox prior to the last attempt to deliver the message via direct call delivery, the call delivery attempts will be automatically terminated.

When subscriber 12 enters a service selection command at step 46 directing system 10 to "send a message", system 10 prompts subscriber 12 at step 78 to input either the a telephone number of an individual called subscriber 16 or a distribution list of a number of called subscribers 16. If the telephone number or distribution list is valid, i.e., all the called parties are subscribers of system 10, then subscriber 12 is permitted to record his message at step 80. After completion of recording step 80, processing proceeds to step 72 wherein subscriber 12 can select between the normal delivery option at step 74 or the rapid delivery option at step 76 as discussed above.

Thus, the present invention provides facilities by which a subscriber 12 may listen to any messages stored for that particular subscriber in a system 10 mailbox, and then directly place a telephone call out of the system without the need to exit the system itself. This features allows subscriber 12 to efficiently respond to each stored message immediately after receiving it. Further, the present invention allows subscriber 12 to send a voice message to another subscriber using either a normal delivery mode or a rapid delivery mode. In the rapid delivery mode, a message is both deposited in the called subscriber 16 voice mailbox, while simultaneously periodic attempts to deliver the message directly to delivery subscriber 16 are made. This increases the probability of having the stored information relayed to called subscriber 16, since even if called subscriber 16 is not in the area of his telephone, the message will still be available for retrieval through the voice mail facility.

Although the present invention has been described in detail, it should be understood that various changes, substitutions and alterations can be made herein without departing from the spirit and scope of the invention as defined by the appended claims.

What is claimed is:

1. A communications system comprising:
  a first circuitry for storing a voice message directed to a subscriber;
  a second circuitry for delivering said stored message directed to a subscriber calling party upon the receipt of a first command; and
  a third circuitry coupled to said second circuitry and operable to establish a direct connection between said subscriber calling party and a called party upon receipt of a second command without exiting said communications system;
  wherein said circuitry for delivering a stored message is operable to automatically deliver a second stored message upon the termination of said direct connection with said called party.

2. The system of claim 1, wherein said second circuitry for delivering a stored message is operable to deliver said first or said second stored messages upon receipt of a voice command.

3. The system of claim 1, wherein said circuitry operable to establish a direct connection is further operable to receive a voice command.

4. A method for processing voice data in an integrated voice communications system, comprising the steps of:
  enabling a caller to store a message for a subscriber responsive to a first command;
  enabling the subscriber to receive a stored message responsive to a second command;
  enabling the subscriber to place a direct dial telephone call without exiting the voice communications system responsive to a third command; and
  following the termination of the telephone call, automatically enabling the subscriber to receive a second stored message.

5. The method of claim 4, wherein said first and second commands comprise voice commands.

6. The method of claim 4, and further comprising the steps of:
  following the termination of the telephone call, automatically enabling the subscriber to cause delivery of a voice message to another subscriber.

* * * * *